United States Patent [19]

Soehnlein et al.

[11] Patent Number: 4,792,065

[45] Date of Patent: Dec. 20, 1988

[54] COMPOSITE EJECTING PISTON WITH CHAMBER

[75] Inventors: Dieter Soehnlein, Kaufering; Josef Neuhoerl, Untermeitingen; Armin Hoffman, Germering, all of Fed. Rep. of Germany

[73] Assignee: Hilti Aktiengesellschaft, Fürstentum, Liechtenstein

[21] Appl. No.: 47,763

[22] Filed: May 8, 1987

[30] Foreign Application Priority Data

May 9, 1986 [DE] Fed. Rep. of Germany ....... 3615659

[51] Int. Cl.[4] ........................ B67D 5/42; G01F 11/00

[52] U.S. Cl. .................................. 222/387; 222/386; 92/181 R

[58] Field of Search .................. 222/386, 387; 92/181, 92/181 P, 182, 240, 245, 160

[56] References Cited

U.S. PATENT DOCUMENTS 1,953,109 4/1934 Heron .............................. 92/160 X
2,371,332 3/1945 Jacobson ............................ 222/386
3,164,303 1/1965 Trautmann ..................... 222/386 X
4,657,161 4/1987 Endo et al. ..................... 222/387 X

FOREIGN PATENT DOCUMENTS 2072755 3/1981 United Kingdom .

*Primary Examiner*—Joseph J. Rolla
*Assistant Examiner*—Stephen Parker
*Attorney, Agent, or Firm*—Toren, McGeady & Associates

[57] ABSTRACT

A composite piston for ejecting a plastic mass from a receptacle includes a piston head and a pressure component which in combination form a chamber. The piston head and pressure component are displaceable within the receptacle from an insertion position into a locked position. When being moved into the locked position, a part of the plastic mass flows through an opening in the piston head into the chamber. After the locked position is established, the opening in the piston head is closed by an extension on the pressure component.

8 Claims, 1 Drawing Sheet

COMPOSITE EJECTING PISTON WITH CHAMBER

BACKGROUND OF THE INVENTION

The present invention is directed to a composite piston for ejecting a plastic mass from a generally cylindrically shaped receptacle. The composite piston includes a piston head arranged to contact the mass to be ejected and a platelike pressure component located on the opposite side of the piston head from the mass. The piston head and the pressure component form a chamber in communication with the space in the receptacle containing the mass with at least one opening in the piston head directed into the chamber and with a venting channel connecting the chamber with the ambient atmosphere.

Cylindrical receptacles with ejecting pistons displaceable within the receptacles have been used for a period of time for dispensing different sealing, filling and coating masses. The receptacles have been known for use with single or multi-component masses which harden after being dispensed from the receptacle or remain plastic to a certain degree. To avoid premature hardening and reaction of the mass in the receptacle during storage and transport, air must be completely evacuated from the receptacle after it is filled with the mass. As a result, air is evacuated by deforming the receptacle in cross section providing a gap-shaped channel through which air can escape when the piston is inserted. Furthermore, it is known to introduce a needle between the wall of the receptacle and the piston for forming venting channels.

In a known composite ejection piston formed of two parts, disclosed in Great Britain Pat. No. 2,072,755, the piston head has apertures communicating between the space containing the mass and a chamber located between the piston head and a pressure component. The chamber is in communication with the atmosphere through venting channels so that air can escape from the space holding the mass through the apertures into the chamber and then through the venting channels into the atmosphere. The apertures in the piston head are kept very small so that air can escape, however, the mass cannot pass through the apertures into the chamber. Apart from the problems concerning venting, it should be noted when used with multi-component masses, that the components are arranged in separate receptacles and are combined immediately before the ejection step in the desired quantity and mixture ratio required for the chemical reaction. Such receptacles are arranged in specialized apparatus for effecting a simultaneously advance of the pistons in the different receptacles which are coupled together by piston rods. For accurate maintenance of the required mixture ratio during the entire dispensing operation, the ejecting piston must be in a specific axial position at the commencement of the dispensing operation. If the required position is not maintained, at the start of the dispensing operation, only one component is ejected and the required mixture is not obtained whereby the mass cannot be used. The machines used for filling the component into the receptacles are, however, relatively inaccurate as far as the metered amount of the various masses is concerned, accordingly, the required precision of the initial positioning of the ejecting pistons cannot be achieved when the pistons are being inserted into the receptacles.

SUMMARY OF THE INVENTION

Therefore, it is the primary object of the present invention to provide a device enabling the accurate initial positioning of the ejecting piston without the presence of air cushions in the mass and independently of the degree to which the receptacles are filled.

In accordance with the present invention, the aperture in the piston head is arranged to be sealed by the pressure component when the initial position of the piston is attained.

When the mass is filled into the receptacle, the ejecting piston can be introduced into an open end of the receptacle and placed in the predetermined initial position while expelling any excess mass and/or air cushion into the chamber formed in the piston. When the piston reaches its initial position, the aperture in the piston head is sealed by the pressure component and the mass cannot be expelled from the space in the receptacle into which it is filled. While the mass flows from the filled space within the receptacle through the aperture into the chamber, air in the chamber is exhausted through venting channels. Any mass which flows into the chamber can dry out or remain plastic under any air remaining in the chamber. To control the drying out process of the mass which penetrates into the chamber, the pressure component can consist of a material permeable for the solvents in the mass. While a soft easily deformable polyethylene can form a seal for the mass, it is permeable to the evaporating styrene contained in the mass. A harder polyamide, impermeable to styrene, can be used as the material for the piston head. Since the aperture can be sealed, it is dimensioned so that viscous masses can be expelled through the aperture into the chamber while the ejecting piston is being inserted and such flow can occur without any considerable resistance.

The pressure needed to press the mass out of its space in the receptacle depends upon the viscosity of the mass and the cross-section of the opening and, under certain circumstances, it can be very high. To assure an absolutely tight seal for the opening, the pressure component backing the piston head has a lug-like extension for sealing the opening. To improve the sealing effect, the lug-like extension on the pressure component and the opening in the piston head can be provided with complementary conical shapes.

In a preferred arrangement, the pressure component can be made to snap into locked engagement with the piston head in the sealed or locked position of the opening. With the snap-in engagement of the pressure component with the piston head, it can be insured that the opening in the piston head remains closed. The snap-in engagement of the pressure component in the piston head can be effected by means of elastically deformable detent members.

In moving form the insertion position into the locked position, the pressure component moves in the axial direction relative to the piston head in sealing the opening in the piston head. To define this position and assure that the aperture is sealed only when the ejecting piston has reached its initial position, it is preferred that the pressure plate has a concave shape on the surface facing the piston head when the component is not locked to the piston head. During the step of sealing the opening, the plate-like pressure component is pressed from its concave-convex state into a flat condition similar to a diaphragm. In displacing the pressure component, a certain resistance against deformation must be overcome. Due to the movement of the plate-like pressure component into the flat state, its outside diameter is increased. The increase in diameter effects a radial widening which can be used for a simultaneous improvement in the sealing effect of the piston against the inside of the receptacle.

To prevent the mass flowing into the chamber from continuing out of the ejecting piston and causing a pollution of the surrounding environment, it is preferred that the venting channels in the plate-like pressure component are sealed by the piston head. Such sealing of the venting channels prevents venting of unpleasant odors caused by the evaporating solvent contained in the mass, this is in addition to preventing the pollution of the environment. Sealing the venting channels can be effected by welding them shut after the piston has been displaced into its initial position. In another preferred embodiment, the venting channels are closed in the locked position by the piston head. Accordingly, sealing of the venting channels cant ake place at the same time that the snap-in action of the pressure component with the piston head takes place. To avoid the build-up of excess pressure or the return flow of the mass through the opening back into the space containing the mass of the receptacle, it is preferable initially to seal the aperture in the piston head and to seal the venting channels only immediately preceding the snap-in action of the pressure component with the piston head.

It is helpful for a complete sealing of the venting channels that the plate-like pressure component has a collar co-acting with the piston head in position for sealing the venting channels. The collar can rest against the inside of a cylindrical wall on the piston head. If the pressure component in its initial position is designed to arch outwardly from the piston head, then when the pressure component is flattened, the collar is pressed outwardly against the piston head.

Another significant feature of the invention is the provision of sealing lips on the pressure components extending in the circumferential direction and effecting a sealing action with the surface of the receptacle. The pressure component can be placed in the manner of a cap on the rearward end of the piston head. The action of the sealing lips on the pressure component is particularly effective if the plate-like component in its undeformed state has an arch-shaped configuration bowing away from the piston head, so that it is radially widened as it is flattened during the sealing of the opening in the piston head. During such a radial widening of the pressure component, the sealing lips are pressed against the wall of the receptacle.

The piston head forms a first seal against the inside of the receptacle. Because of the high ejection pressure, a portion of the mass can flow around the front sealing edge of the piston head. To prevent such a flow of the mass from reaching the outside of the receptacle and polluting the environment, it is advantageous if the piston head has leakage bores connecting the chamber with an outer annular space bounded by the inside of the receptacle, the piston head and the sealing lips. Any of the mass which flows into the annular space can then flow into the chamber within the ejecting piston so that there is no increase in pressure built up in front of the sealing lips.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
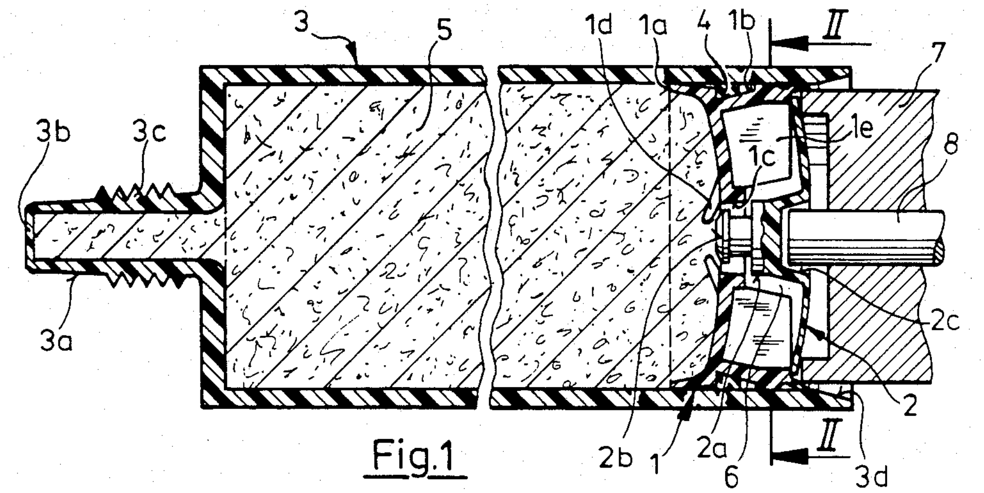
FIG. 1 is an axially extending sectional view of an ejecting pistion embodying the present invention in the insertion position before the sealing of the opening in the piston head is effected.
Figure 2:
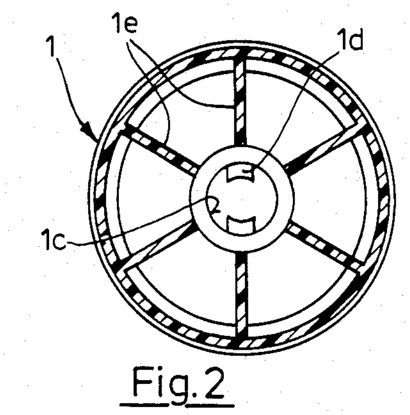
FIG. 2 is a cross-sectional view through the ejecting pistion taken along the line II—II in FIG. 1.
Figure 3:
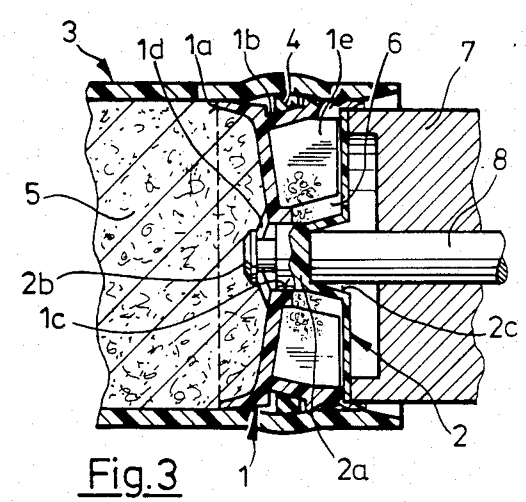
FIG. 3 is an axially extending partial sectional view, similar to FIG. 1, however, with the ejecting piston in the locked position.

Ejecting piston shown in FIGS. 1 to 3 is made up of a piston head 1 and a plate-like pressure component 2. The ejecting piston is positioned, as shown in FIGS. 1 and 3, in the rearward end of a recptacle 3. By pressing the ejecting pistion in its axial direction, corresponding to the axial direction of the receptacle, the mass 5 within the receptacle can be ejected or dispensed. As viewed in the drawing, the piston head has disc-like wall member with a first or front face directed against the mass within the receptacle and an oppositely directed second face. An annular sealing edge **1*a* extends forwardly from the first face and is in sealing contact with the inside surface of the receptacle 3. The first face of the piston head tapers inwardly from the sealing edge 1*a*, sloping away from the dispensing end of the receptacle. In the outer circumferencial surface of the piston head, there is a groove 1b in which a sealing ring 4 is positioned. In the piston head a central opening 1*c* extends through the first face. On the second face of the piston head 1, a plurality of ribs 1e extend in the axial direction as well as in the radial direction, note FIG. 2. At its dispensing end, the receptacle 3 has a centrally located dispensing nozzle 3*a* with the forward or left-hand end of the nozzle sealed with a destructible foil 3*b*. THe nozzle 3*a* has a thread 3c on its outside surface for screwing on an ejection tube, not shown. At its rearward end, the right end is viewed in FIGS. 1 and 3, the inside of the rectpacle has a bevel 3*d*. The bevel 3d faciltiates the insertion of the ejection piston. As shown, the receptacle is filled with the mass 5. In the insertion position of the ejection piston, as shown in FIG. 1, the plate-like pressure component 2 has a concave-convex configuration so that it arches away from the piston head. In other words, the plate-like pressure component has a first surface facing the second face of the piston head which has a concave configuration while the oppositely facing second surface of the component has a convex shape. Centered on the axis of the piston head, the pressure component 2 has a lug-shaped extension 2*a*** projecting toward the piston head and with a portion of its axial length having a diameter corresponding to the diameter of the opening 1*c* in the piston head 1. At its front end, that is the end facing toward the dispensing end of the receptacle 3, the extension 2*a* has an annular bead 2*b*. The bead in combination with the detent members 1d on the first face of the piston head form a detent lock. Pressure component 2 has a recess 2*c* in its second surface in alignment with the extension projection 2*a*. A chamber 6 is located between the second face of the piston head 1 and the first surface of the plate-like pressure component 2. Chamber 6 is in flow communication with the space within the receptacle containing the mass 5. Note FIG. 1. If the ejecting piston is displaced in the axial direction into the receptacle by a ram 7, toward the nozzle 3*a* of the receptacle, a portion of the mass 5 flows through the opening 1*c* into the chamber 6. Accordingly, the initial position of the ejecting piston can be accurately adjusted. When this initial position is reached, the pressure component 2 is pressed against the piston head 1 by means of a tappet 8. The movement of the pressure component 2 by the tappet 8 presses the extension 2*a* into the opening 1*c* and prevents any additional flow of mass 5 into the chamber 6. Relative to the piston head 1, the plate-like pressure component 2 is locked in the position shown in FIG. 3, by the interaction of the detent members 1*d* and the bead 2*b*. The portion of the mass 5, which has entered the chamber 6, is enclosed. The pressure plate moves from the concave-convex configuration shown in FIG. 1 into the flattened configuration shown in FIG. 3 with the first surface of the pressure component bearing against the rearward ends of the ribs 1e, that is the ends spaced from the second face of the piston head. As a result of its deformation, the pressure plate 2 is widened in the radial direction and presses against the end of the piston head spaced rearwardly from its second face so that the rearward end of the piston head is pressed against the inside wall of the receptacle 3.

Figure 4:
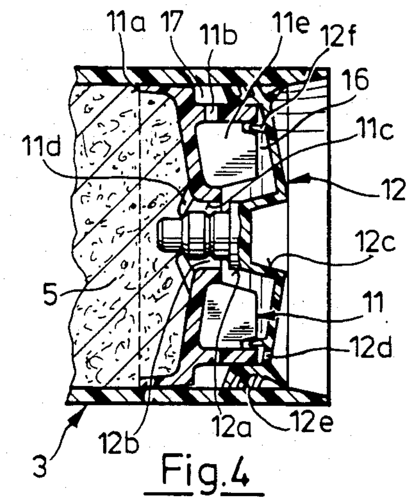
FIG. 4 is a partially axially extending sectional view of an ejecting piston embodying the present invention and shown in the insertion position.
Figure 5:
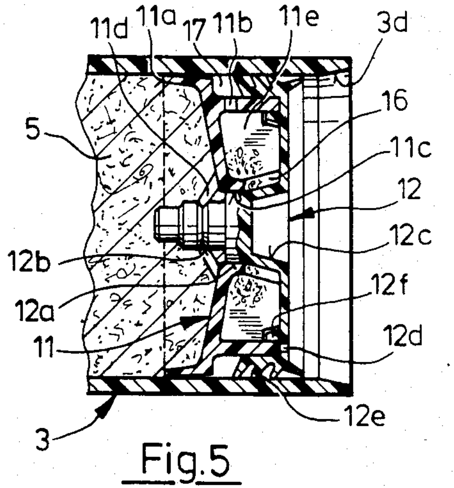
FIG. 5 is a view similar to FIG. 4, however, with the ejecting piston in the locked position with the opening in the piston head sealed.

Another embodiment of the ejection piston is displayed in FIGS. 4 and 5 is made up of a pison head 11 and a plate-like pressure component 12. The piston head has a disc-like wall extending transversely of its axial direction, as in FIG. 1, with a first face directed toward the dispensing end of the receptacle and an oppositely directed second face. Similarly, the pressure component 12 has a first surface extending transversely of the axial direction facing toward the second face of the piston head and a second surface facing toward the rearward end of the receptacle 3. The piston head 11 has an axially extending annular sealing edge 11*a* extending axially from the radially outer edge of the first face with the sealing edge contacting the inside surface of the receptacle 3. In its radially outer surface, midway between the sealing edge 11*a* and the trailing end of the piston head, there is a leakage bore 11*b*, extending through the piston head from an inner chamber 16 to an outer annular chamber 17. Any of the mass which has not been wiped off the surface of the receptacle by the sealing edge 11*a* can flow into the outer chamber 17 and through the bore 11*b*, into the inner chamber 16. Piston head 11 has a central opening 11*c* extending through its first face into the inner chamber 16. Further, detent members 11*d* are located on the first face of the piston head 11 extending inwardly over the opening 11*c*. On the second face, the piston head 11 has a number of ribs 11*e* extending in the axial direction as well as in the radial direction. Plate-shaped pressure component 12 is deformable and is provided with a cylindrically shaped projection or extension 12*a* extending toward the piston head centered with the opening 11*c*. Extension 12*a* has a diameter for a portion of its axial length, corresponding to the diameter of the opening 11*c*. Extension 12*a* has an annular detent groove 12*b*. The second surface of the pressure component 12 has depression 12*c* centered with the extension 12*a*. In addition, the pressure component 12 has at least one venting channel 12*d* open to the ambient atmosphere exterior of the receptacle 3. Venting channel 12*d* provides for the escape of air present in the inner chamber 16. Sealing lips 12*e* are located about the radially outer circumference of the pressure component 12 located between the inside surface of the receptacle 3 and the radially outer surface of the piston head projecting rearwardly from its second face. Radially inwardly from the sealing lips 12*e*, the pressure component 12 has an annular collar 12*f* extending in the axial direction toward the second face of the piston head 11. The outside diameter of the collar 12*f*, is arranged as compared to the diameter of the adjacent inside surface of the piston head 11, so that in the insertion position as displayed in FIG. 4, an annular gap is present between the collar and the piston head whereby air can flow out of the inner chamber 16 into the atmosphere flowing through the vent channel 12*d*.

As shown in FIG. 5, the plate-like pressure component 12 has been deformed from the concave-conves configuration shown in FIG. 4 into the flattened configuration shown in FIG. 5, with the pressure component locked with the piston head 11 by the interaction of the detent members 11*d* in the detent groove 12*b*. In this locked position, the opening 11cin the piston head is sealed by the extension 12*a* on the pressure component 12. At the end of the deformation movement of the pressure component 12 into the flattened state, the venting channel 12*d* is also sealed by the collar 12*f* cooperating with the piston head 11. The closure of the venting channel 12*d* prevents any escape of vapor from the mass which has entered into the inner chamber 16, so that the vapor cannot flow into the ambient atmosphere.

While specific embodiments of the invention have been shown and described in detail to illustrate the application of the inventive principles, it will be understood that the invention may be embodied otherwise without departing from such principles.

We claim:

1. Device for dispensing a plastic mass comprising a composite piston for ejecting or dispensing the plastic mass from a substantially cylindrically-shaped receptacle wherein the improvement comprises that said composite piston includes a piston head having a central axis extending in the direction for ejecting the plastic mass from the receptacle and said piston head being axially displaceable in the receptacle, said piston head having a disc-like wall member extending transversely of the central axis and said wall member having a first face arranged to be directed against the plastic mass and an oppositely facing second face, said composite piston includes a plate-like pressure component extending transversely of the central axis and located on the second face side of said piston head, said pressure component having a first surface and a second surface extending transversely to the central axis with the first surface facing the second face of said piston head and said second surface facing in the opposite direction, said piston head and pressure component being spaced apart in the direction of the central axis for at least a part of the second face of said piston head and the first surface of said pressure component for forming a chamber there-between, said piston head and pressure component being displaceable within the receptacle between an insertion position and a locked position, said disc-like wall member having an opening therethrough in the insertion position for flow of the mass into said chamber from the first face side of said disc-like wall member and said pressure component including means for sealing said opening in said disc-like wall member when said piston head and pressure component are in the locked position, said pressure component has at least one venting channel therethrough in communication with the ambient atmosphere in the insertion position of said piston and said venting channel being sealed by said piston head in the locked position of said composite piston.

2. Device, as set forth in claim 1, wherein said means for sealing said opening comprises a lug-like extension extending in the axial direction from the first surface of said pressure plate.

3. Device, as set forth in claim 2, comprising means on said piston head and pressure component for locking said piston head and pressure component in the locked position when said extension seals said opening.

4. Device, as set forth in claim 1, wherein said first surface of said pressure component is concave and said second surface of said pressure component is convex in the insertion position of said piston.

5. Device, as set forth in claim 1, wherein said pressure component includes an annular collar encircling the axis of said piston head and co-acting with said piston head for sealing said venting channel.

6. Device, as set forth in claim 1, wherein said pressure component has a radially outer circumference with sealing lips secured thereto extending in the circumferential direction around the piston head axis and extending from said pressure component toward said piston head for effecting a sealing action with the receptacle.

7. Device, as set forth in claim 1, wherein said piston head has an annular wall encircling the central axis thereof and spaced outwardly from the central axis and arranged to be located radially inwardly from the receptacle, and a leakage bore extending through said annular wall.

8. Device, as set forth in claim 7, wherein said annular wall in combination with said pressure component and said receptacle forms an outer chamber in communication with said leakage bore and said piston head and said pressure component form said chamber as an inner chamber in communication with said leakage bore so that flow into said outer chamber can pass through said leakage bore into said inner chamber.

* * * * *